US008655257B2

(12) United States Patent  
Spychaiski

(10) Patent No.: US 8,655,257 B2  
(45) Date of Patent: Feb. 18, 2014

(54) RADIO CONTROLLED COMBAT TRAINING DEVICE AND METHOD OF USING THE SAME

(76) Inventor: Daniel Spychaiski, Bartlett, IL (US)

( * ) Notice: Subject to any disclaimer, the term of this patent is extended or adjusted under 35 U.S.C. 154(b) by 0 days.

(21) Appl. No.: 13/454,396

(22) Filed: Apr. 24, 2012

(65) Prior Publication Data

US 2012/0208150 A1    Aug. 16, 2012

Related U.S. Application Data

(63) Continuation-in-part of application No. 12/546,480, filed on Aug. 24, 2009, now abandoned.

(51) Int. Cl.  
*F41G 3/26* (2006.01)  
*F41H 7/02* (2006.01)

(52) U.S. Cl.  
USPC .................................... 434/1; 434/11; 434/23

(58) Field of Classification Search  
CPC .............. F41G 3/26; F41H 7/02; B62D 11/04  
USPC .................................. 434/1, 11, 23  
See application file for complete search history.

(56) References Cited

U.S. PATENT DOCUMENTS

| | | | | |
|---|---|---|---|---|
| 4,934,937 A | * | 6/1990 | Judd | 434/21 |
| 5,350,180 A | * | 9/1994 | Acock | 273/406 |
| 5,599,187 A | * | 2/1997 | Mesiano | 434/19 |
| 5,613,913 A | * | 3/1997 | Ikematsu et al. | 463/52 |
| 5,823,779 A | * | 10/1998 | Muehle et al. | 434/21 |
| 7,735,832 B2 | * | 6/2010 | Bliehall | 273/393 |
| 7,900,927 B1 | * | 3/2011 | Bliehall | 273/359 |
| 8,006,981 B2 | * | 8/2011 | Gibson | 273/359 |
| 8,205,888 B2 | * | 6/2012 | Deatherage, Jr. | 273/405 |
| 2006/0290063 A1 | * | 12/2006 | Hagar | 273/369 |
| 2007/0105070 A1 | * | 5/2007 | Trawick | 434/11 |
| 2007/0238073 A1 | * | 10/2007 | Portoghese et al. | 434/21 |
| 2009/0299525 A1 | * | 12/2009 | Takahashi et al. | 700/258 |

\* cited by examiner

*Primary Examiner* — Xuan Thai  
*Assistant Examiner* — Alvin Carlos  
(74) *Attorney, Agent, or Firm* — Justin Lampel

(57) ABSTRACT

A moving, shooting, video recording, human-appearing combat training machine comprising of three major components referred to as the mobile base unit, the target body and an unattached control system is provided. The base unit has a chassis plate driven by a plurality of motors and a plurality of wheel assemblies within an exterior armor which protects internal components of the chassis from projectile impacts. The target body mounts to an extension plate affixed to the underside of the chassis plate of the base unit, creating an overall human appearing subject that moves in varying directions. The combat training machine returns fire by shooting projectiles while recording video with an electronic or mechanical sighting system for target and video playback for training analysis.

12 Claims, 14 Drawing Sheets

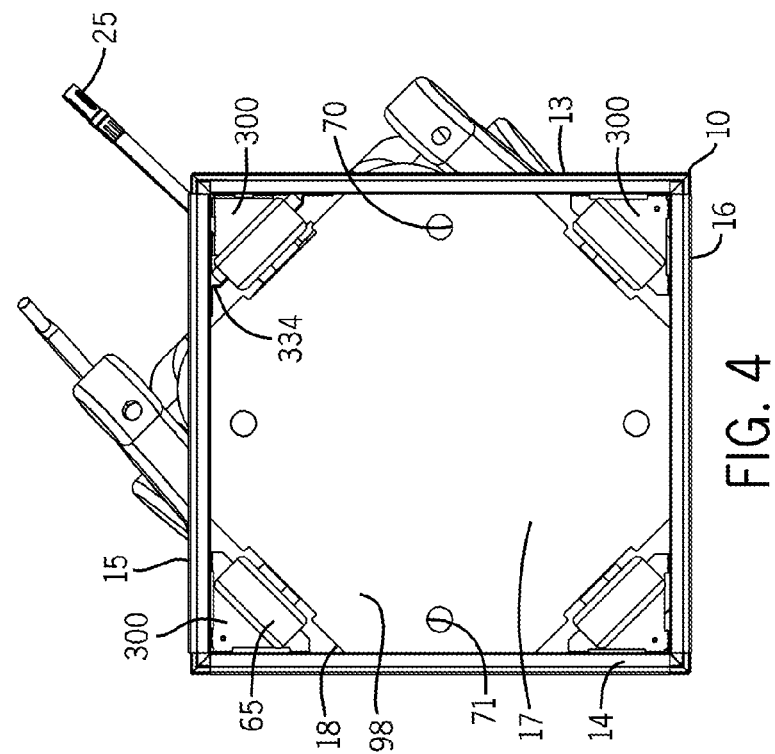
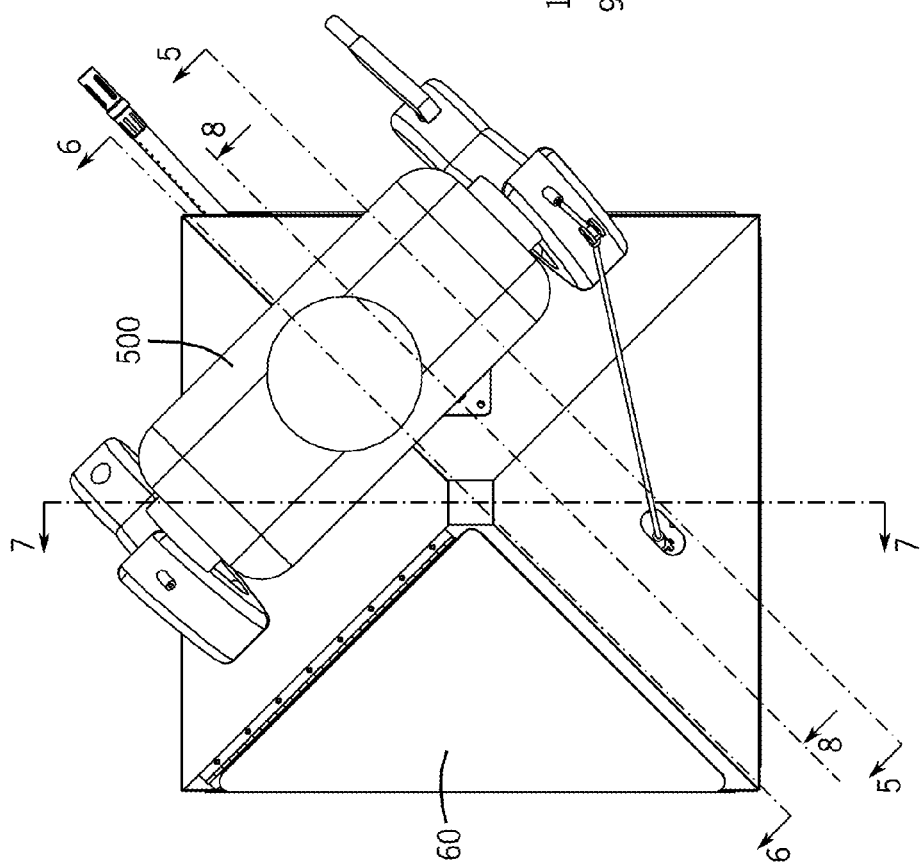
FIG. 4
FIG. 3

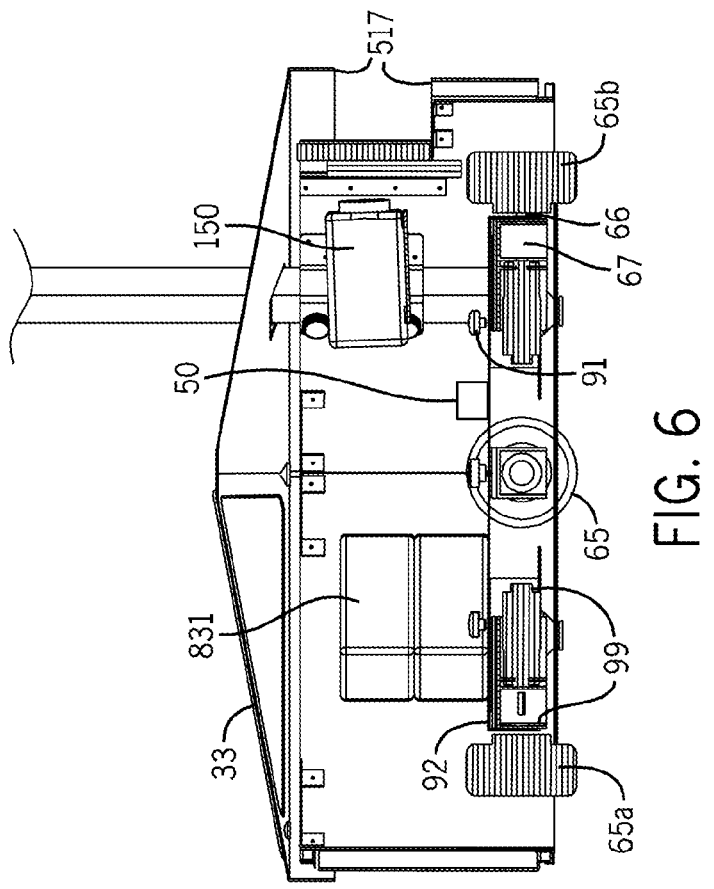
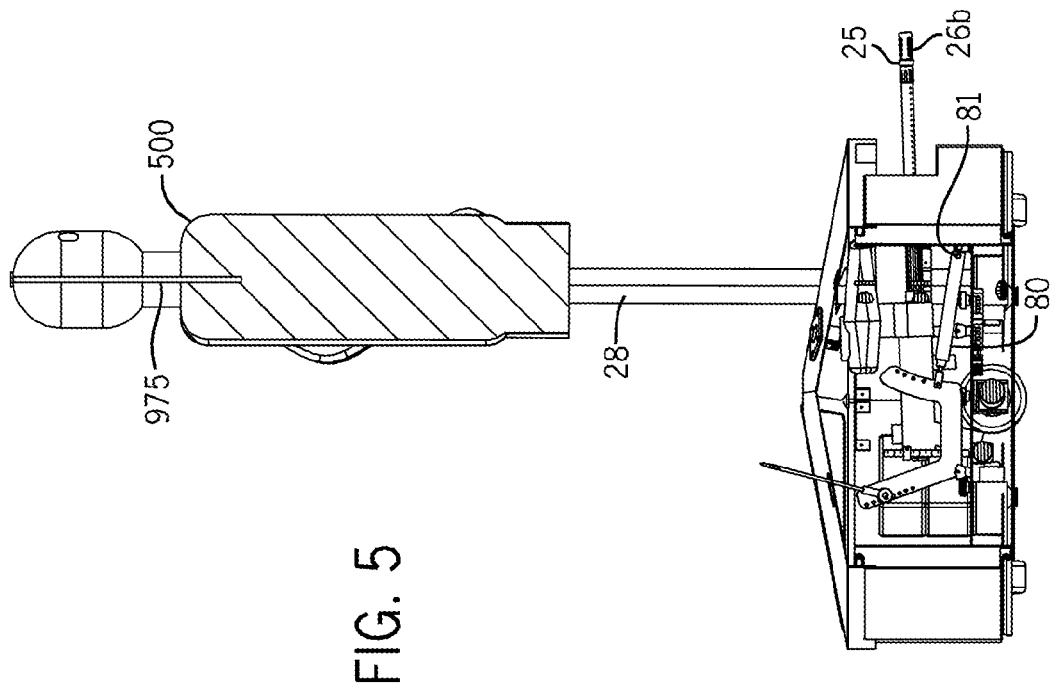
FIG. 6
FIG. 5

RADIO CONTROLLED COMBAT TRAINING DEVICE AND METHOD OF USING THE SAME

CROSS REFERENCE TO RELATED APPLICATION

The following application is a Continuation-In-Part of U.S. Ser. No. 12/546,480 filed Aug. 24, 2009 now abandoned. The present application claims the priority benefit of the Ser. No. 12/546,480 application; the entire contents of which are incorporated by reference.

BACKGROUND

A moving, shooting, video recording, human-appearing combat training machine comprising of three major components referred to as the mobile base unit, the target body and an unattached control system is provided. The base unit has a chassis plate driven by a plurality of motors and a plurality of wheel assemblies within an exterior armor which protects internal components of the chassis from projectile impacts. The target body mounts to an extension plate affixed to the underside of the chassis plate of the base unit, creating an overall human appearing subject that moves in varying directions. The combat training machine returns fire by shooting projectiles while recording video for training analysis.

Attempts have been made to provide real-life combat training exercises and machines. For example, U.S. Pat. No. 8,006,981 to Gibson discloses a moving target system for defensive training having an elongated ground-based track defining a track axis, a trolley operable to move along the track, the trolley having a target support facility, a driver operable to move the trolley along the track, and the target facing in a direction angularly offset from perpendicular to the track axis. The target support facility may be operable to fall from a vertical position when the trolley reaches an end of the track. There may be an actuator operably connected to the driver to initiate movement of the trolley when actuated.

U.S. Pat. No. 5,823,779 to Muehle et al. discloses weapons training range having a simulated weapons use scenario including return fire. A microprocessor selects branches from a multi-branch program and causes an image projector to project sub-scenarios on a display screen visible to a participant. In response to the sub-scenarios, the participant fires at projected threats. Return fire simulators positioned behind the display screen return fire toward the participant. Obstructions are placed in the weapons range to provide cover for the participant. A video camera and X-Y position sensor identify the X-Y location of the participant and try to detect exposed portions of the participant. Based upon the identified X-Y location and any detected exposed portions, the microprocessor aims the return fire simulators to provide simulated return fire. To simulate real world aiming, the microprocessor induces time-based and response-based aiming errors. Additionally, the microprocessor may aim the return fire simulators at objects in the participation zone to produce deflected fire that may also strike the participant. Further, U.S. Pat. No. 5,980,254 also to Muehle et al. is a continuation of the U.S. Pat. No. 5,823,779 patent and provides further inventive steps.

U.S. Patent Publication No.: 20070105070 to Trawick discloses an electromechanical soldier equipped with standard armament, reconnoiter and data gathering equipment replaces soldiers, police officers and the like in dangerous, and life-threatening situations. The soldier may be equipped with interchangeable weapon systems coupled to a chassis. The chassis rotates the weapons in a 360 degree manner while the altitude of the weaponry may be raised and lowered. A global positioning system may be included for location and control by a remote operator. The soldier may be equipped with omni and vertical direction view cameras for performing surveillance and target acquisition. It may be equipped with titanium armor for withstanding attacks. The chassis is equipped with wheels for maneuvering it across rough terrain and stairs. It may be programmed with facial, voice and other such recognition systems. Duplex communications is provided between the soldier and a remote operator for providing operating instructions and real-time data.

However, these patents fail to provide a combat training exercise which is easy to use and efficient as is described in the present application. More specifically, these patents fail to disclose a training device and method wherein an officer may fire live rounds at a moving target. A need therefore exists for an improved combat training exercise which simulates a live combat or real-life officer shooting situation.

SUMMARY OF THE INVENTION

A moving, shooting, video recording, human-appearing combat training machine comprising of three major components referred to as the mobile base unit, the target body and an unattached control system is provided. The base unit has a chassis plate driven by a plurality of electric motors and a plurality of wheel assemblies within an exterior armor which protects internal components of the chassis from projectile impacts. The target body mounts to an extension plate affixed to the underside of the chassis plate of the base unit, creating an overall human appearing subject that moves in varying directions. The combat training machine returns fire by shooting projectiles while recording video for training analysis.

An advantage of the present combat training device and method of using the same is to provide a real-life training scenario for police and military officials to practice firearm decision making and firearm training.

Yet another advantage of the present combat training device and method of using the same is to provide a combat training device which allows a user to return fire at the person being trained from a safe, remote location.

And another advantage of the present combat training device and method of using the same is to provide a combat training device which has internal sensors for determining the position of a person being trained.

An advantage of the present combat training device and method of using the same is to provide a combat training device which has an internal camera which allows a controller from a remote location to control the movement and firing of the combat training device.

BRIEF DESCRIPTION OF THE DRAWINGS

FIG. 3 illustrates a top view of the training device.

FIG. 4 illustrates a bottom view of the base portion of the training device.

FIG. 5 illustrates a detailed side cut away view of the training device.

FIG. 6 illustrates a detailed side cut away view of the interior of the base portion.

DETAILED DESCRIPTION OF THE PREFERRED EMBODIMENT

A moving, shooting, video recording, human-appearing combat training machine comprising of three major components referred to as the mobile base unit, the target body and an unattached control system is provided. The base unit has a chassis plate driven by a plurality of motors and a plurality of wheel assemblies within an exterior armor which protects internal components of the chassis from projectile impacts. The target body mounts to an extension plate affixed to the underside of the chassis plate of the base unit, creating an overall human appearing subject that moves in varying directions. The combat training machine returns fire by shooting projectiles while recording video for training analysis.

Figure 1:
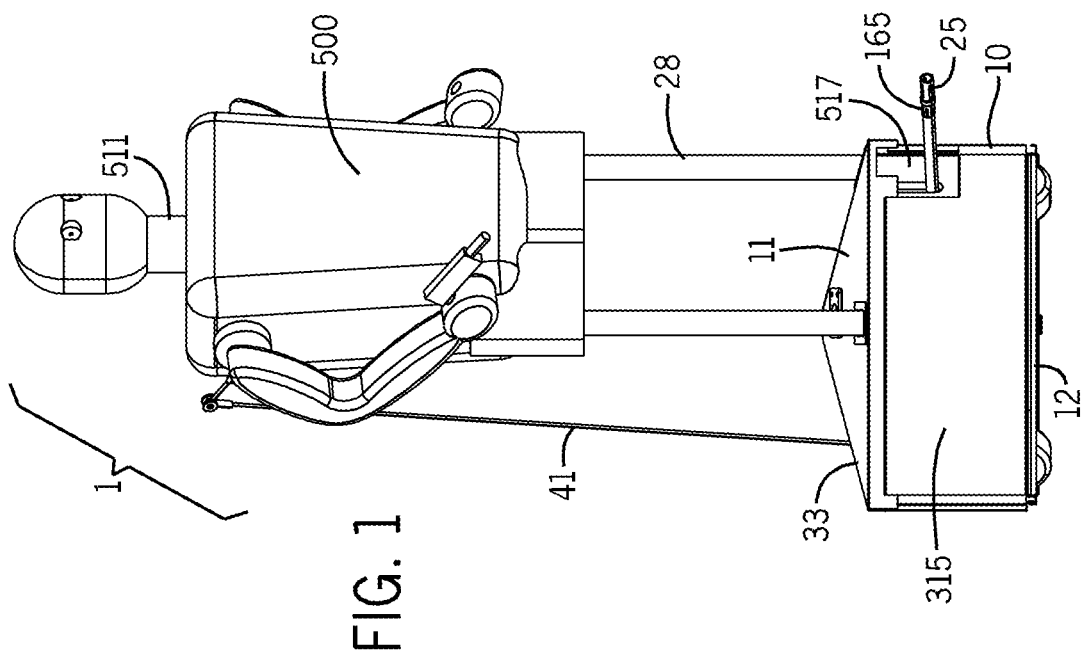
FIG. 1 illustrates a front perspective view of the training device.
Figure 7:
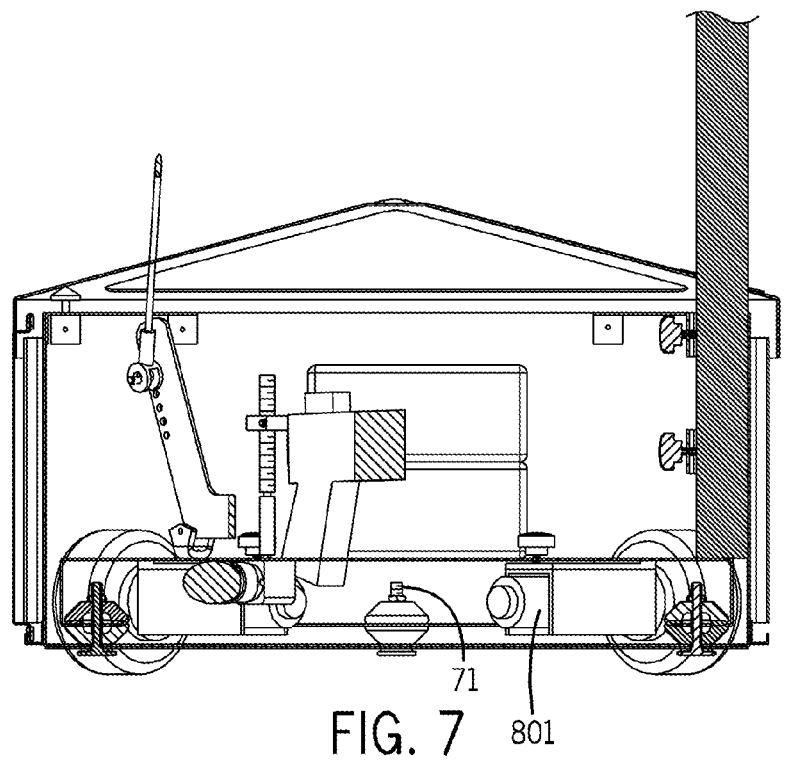
FIG. 7 illustrates a detailed interior view of the base portion of the training device.
Figure 14:
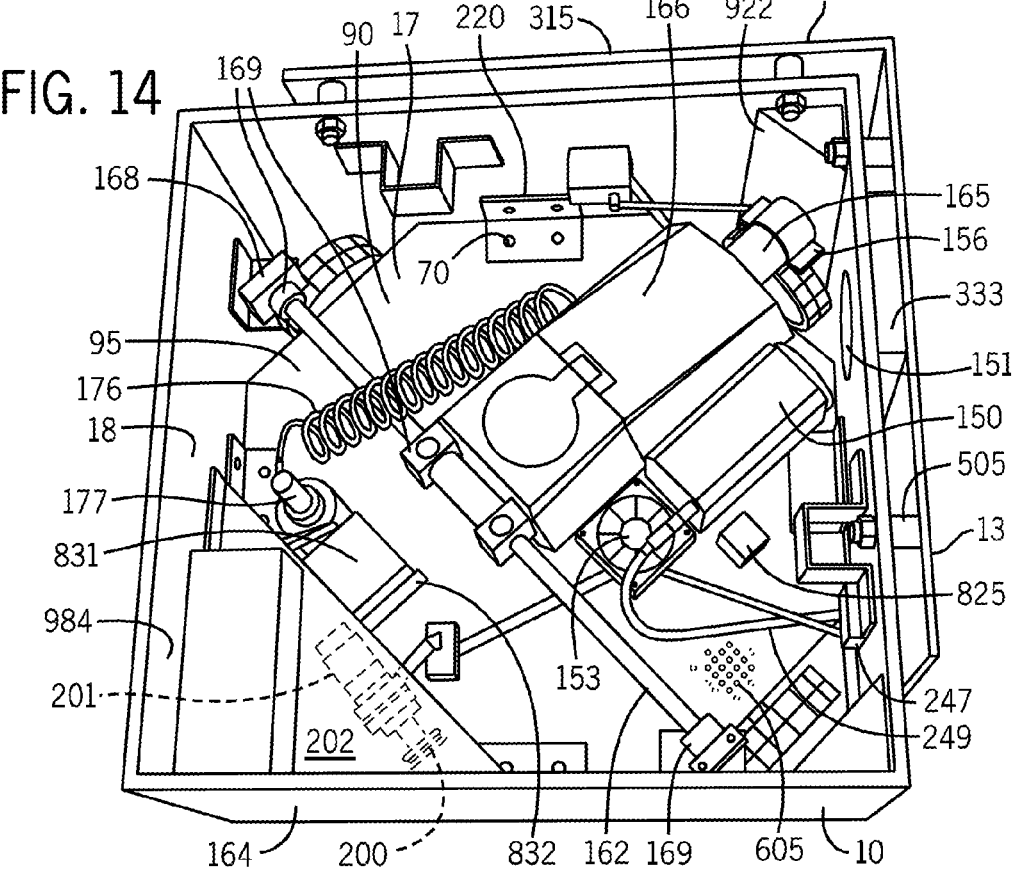
FIG. 14 illustrates a perspective view of the interior of the base portion of the training device.

Referring now to the drawings wherein like numbers refer to like parts, FIG. 1 illustrates the combat training device 1. The combat training device 1 may have a base portion 10 and a target portion 500 (as described below). In an embodiment (not shown), the device 1 may have multiple target portions 500. The base portion 10 may be protected by a bullet resistant material so as to withstand the force of a bullet fired by a police officer, military personnel, etc. In an embodiment, a bullet resistant plate 315 may be secured over at least a portion of the base portion 10 (FIG. 14 illustrates a bullet resistant plate 315 secured over two of the four sides of the base portion 10). The target portion 500 is preferably shaped to resemble a person or a torso of a person. It should be noted that in an embodiment, the target portion 500 may not resemble the torso of a person, but another object. The target portion 500 rests upon and is secured to the base portion 10. The bullet resistant plate 315 will, in most cases, receive the majority of projectile impacts upon the base portion 10. The bullet resistant plate 315 is easily removed from the base portion 10 for repair or replacement.

The base portion 10 may be largely, for example, square in shape and may be mobile. The base portion 10 may have a top 11, a bottom 12, a front 13, a back 14, a left side 15, a right side 16 and an interior 17 (FIG. 4). Preferably, the base portion 10 is constructed of a strong sheet metal material such as, for example, aluminum, composite or any other strong, lightweight material. The base portion 10 may have four corners each of which may have reinforcement gussets 300 (FIG. 4) that also functions as the lid mounting platform (as described below).

Figure 13:
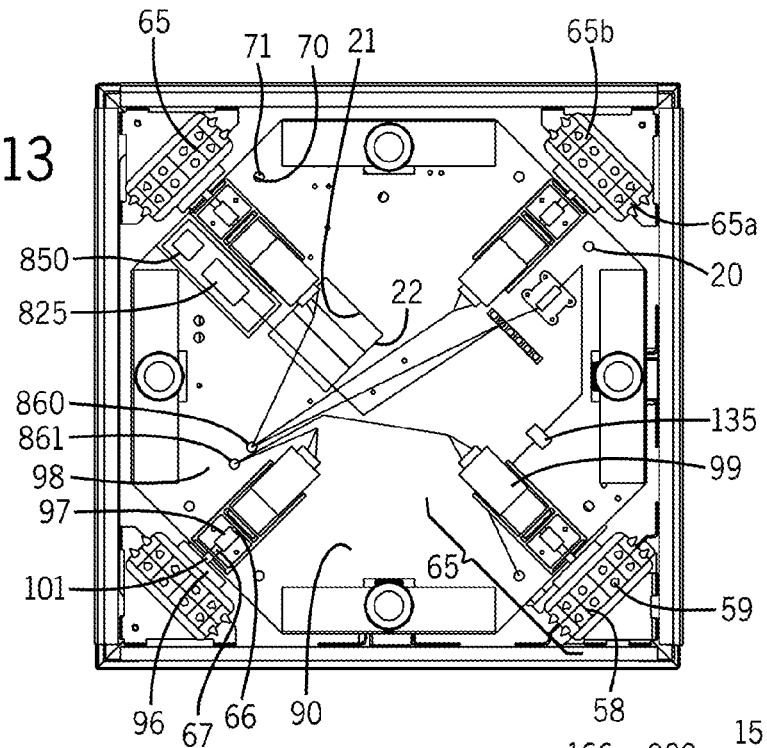
FIG. 13 top view of the interior of the base portion of the training device.

Referring now to FIGS. 13 and 14, the base portion 10 may have a chassis plate 90. The chassis plate 90 may be located within the interior 17 of the base portion 10 and may rest in a largely parallel position with respect to the ground. The chassis plate 90 may further have a single centrally located or offset opening 21 and a plurality of mounting holes 20 wherein the centrally located opening 21 allows a training weapon 160 (FIG. 8) to elevate by way of the rear portion of the training weapon 160 lowering into the centrally located opening 21, which may be largely square in shape and may have sides being largely equal length 22.

The training weapon 160 may have a muzzle 25 (FIG. 1) which may extend from the interior 17 of the base portion 10 out through the front 13/left side 15 (at an angle) of the base portion 10. An opening 517 may be located where the front 13 and the left side 15 of the base portion 10 meet. The opening 517 may be largely rectangular in shape and may allow the training weapon's muzzle 25 to move vertically from a first position 26a as in FIG. 9, all the way through to a second position 26b as in FIG. 5 and may further allow the training weapon's muzzle 25 to operate at any location between the first position 26a and the second position 26b. The training weapon's muzzle 25 may be generally cylindrical having a diameter 30 (FIG. 9) which is less than the width of the opening 517.

Figure 2:
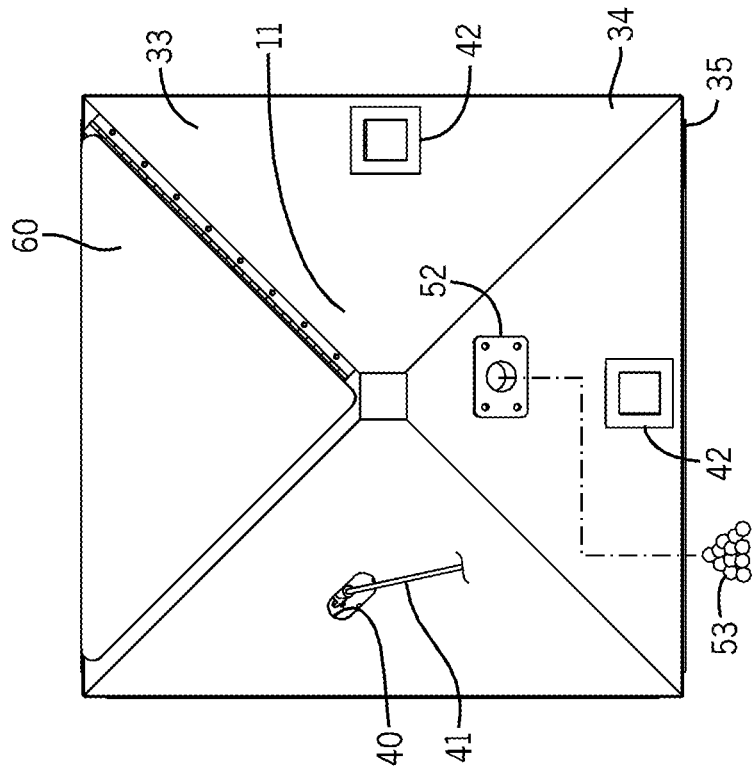
FIG. 2 illustrates a top view of the base portion of the training device.

Referring now to FIG. 2, the top 11 of the base portion 10 of the device 1 is illustrated. The top 11 of the base portion 10 of the device 1 may have a removable cover plate 33. The removable cover plate 33 may have a top 34 and a bottom 35. The removable cover plate 33 may have a cutout portion 40 which may allow a cable 41 (as described below) to pass from the interior 17 of the base portion 10 out of the base portion 10 and up to the target portion 500. In an embodiment, the cable 41 may be a hook and loop fastener strap, such as a Velcro strap.

The cable 41 may be merely mechanical in nature or may be electrical so as to transfer an electrical signal from a central computer unit 50 (FIG. 8) located within the interior 17 of the base portion 10 to the target portion 500. The centralized computer unit 50 may be preprogrammed with a set of computerized instructions as well as may receive instruction through wireless transmission or from wired transmission from a remote location. The electrical signal may provide instruction for the target portion 500 to alter or otherwise move in position.

The top 34 of the removable cover plate 33 further may have at least one opening 42 for receiving a support shaft 28 (the legs) of the target portion 500. More specifically, the support shaft(s) 28 may extend from the target portion 500 to the base portion 10 and may support the target portion 500. The support shafts 28 may connect the target portion 500 to the base portion 10. The support shafts 28 may be made from a material strong enough to withstand repeated strikes by live gunfire 512 (FIG. 18) or non-lethal projectiles 700. A kill zone plate 975 (FIG. 5) may be located on the target portion 500. The kill zone plate 975 may be constructed from a bullet resistant material that may be mounted in front of or behind neck area 511 (FIG. 1) of the target portion 500. The kill zone plate 975 may help determine if a projectile fired from the trainee 611 (FIG. 18) would have been a fatal shot.

The removable cover plate 33 of the base portion 10 may further have a training projectile filler flange 52. The projectile filler flange 52 (FIGS. 2 and 8) allows for the filling of training projectiles 53 for the return fire of the combat training device 1. The top 11 of the base portion 10 may further have a removable access panel 60. The removable access panel 60 may be, for example, triangular in shape and may allow for easy access to the interior 17 of the base portion 10 without the need to remove the entire removable cover plate 33.

Referring now to FIG. 13, located near the bottom side 12 of the base portion 10 and on a bottom side 98 of the chassis plate 90 may be a plurality of openings 70. Each of the openings 70 may receive a bolt 71. The bolts 71 may extend upward in a perpendicular manner with respect to the removable cover plate 33. The bolts 71 may run substantially parallel with respect to one another. The bolts 71 may be secured to the removable cover plate 33 of the device 1. FIG. 13 illustrates eight bolts 71; however the device 1 may have a greater or fewer number of bolts 71 secured to the removable cover plate 33.

As stated above, located under the removable cover plate 33, and within the interior 17 of the base portion 10, may be the chassis plate 90. The chassis plate 90 may be located roughly half way between the top 11 of the base portion 10 and the bottom 12 of the base portion 10. The chassis plate 90 is illustrated in an octagonal shape; however the chassis plate 90 may be of any suitable shape. The chassis plate 90 may be connected with a drive motor 801 (FIG. 17) and drive motor mount 92 (FIG. 6). The drive motor mount 92 may secure the drive motor 801 to the chassis plate 90 which may also consist of a drive motor mount adjustment screw 91. The drive motor 801 may provide the power to turn wheels 65*a* and 65*b* of a wheel assembly 65. In an embodiment, the device 1 may move my tank tracks, as opposed to wheels 65.

Referring now to FIG. 13, located within the interior 17 of the base portion may be a plurality of wheel assemblies 65. The figures illustrate four wheel assemblies 65; however, it should be understood that greater or fewer wheel assemblies 65 may be used. The wheel assemblies 65 may be located in the corners of the base portion 10. The wheel assemblies 65 may be connected to a wheel drive 66. The wheel drive 66 may have an axle 67 wherein the wheel assemblies 65, rotates around.

In an embodiment, four sets of wheel assemblies 65 are illustrated. Each wheel assembly 65 may have two wheels 65*a* and 65*b*. The wheels 65*a* and 65*b* may be singular or multiple row multi-directional wheels which may rotate independently and in an opposite direction of each other allowing the entire device 1 to rotate three hundred and sixty degrees from a zero radius. Preferably, the wheels 65*a* and 65*b* are located at the corners of the base portion 10 such that a first set of two wheel drive assemblies 65 are parallel to each other and the other set of two wheel drive assemblies 65 are also parallel to each other wherein axels 67 of adjacent wheel drive assemblies 65 are substantially perpendicular with respect to each other. The wheels 65*a* and 65*b* may have either smooth or aggressive treads 58 or spikes 59 depending on the surface for which the training exercise is taking place on.

Figure 10:
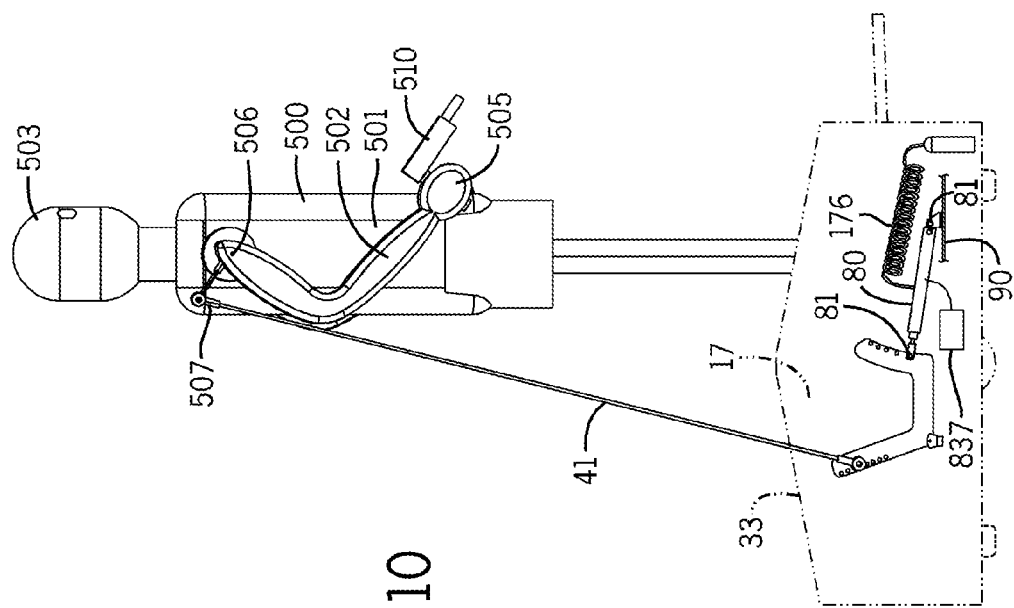
FIG. 10 illustrates a side view of the target portion of the training device.
Figure 11:
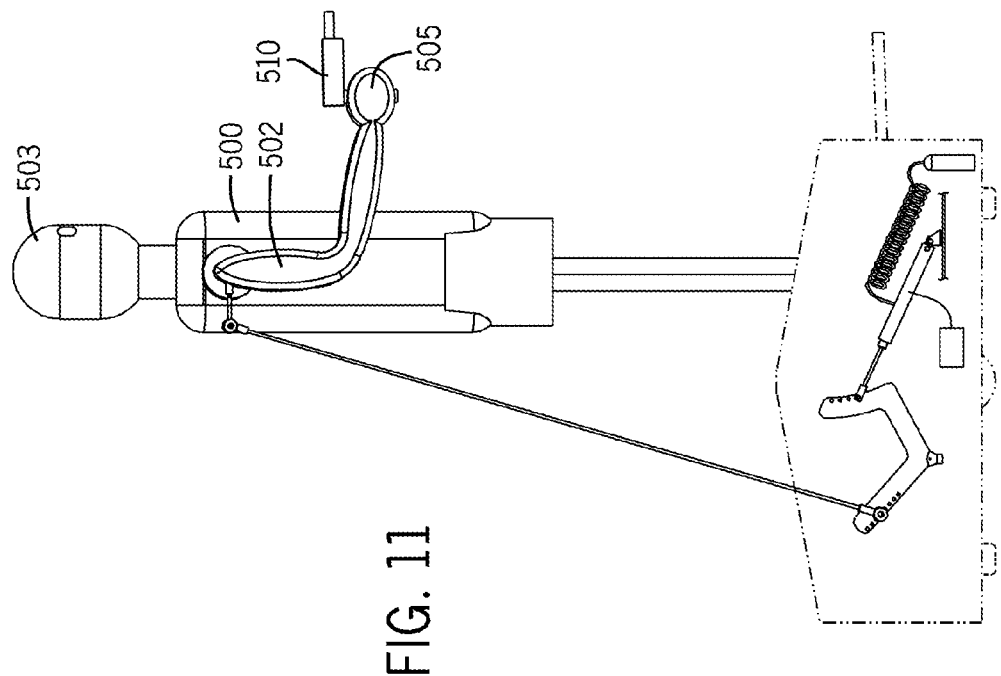
FIG. 11 illustrates a side view of the target portion of the training device.
Figure 12:
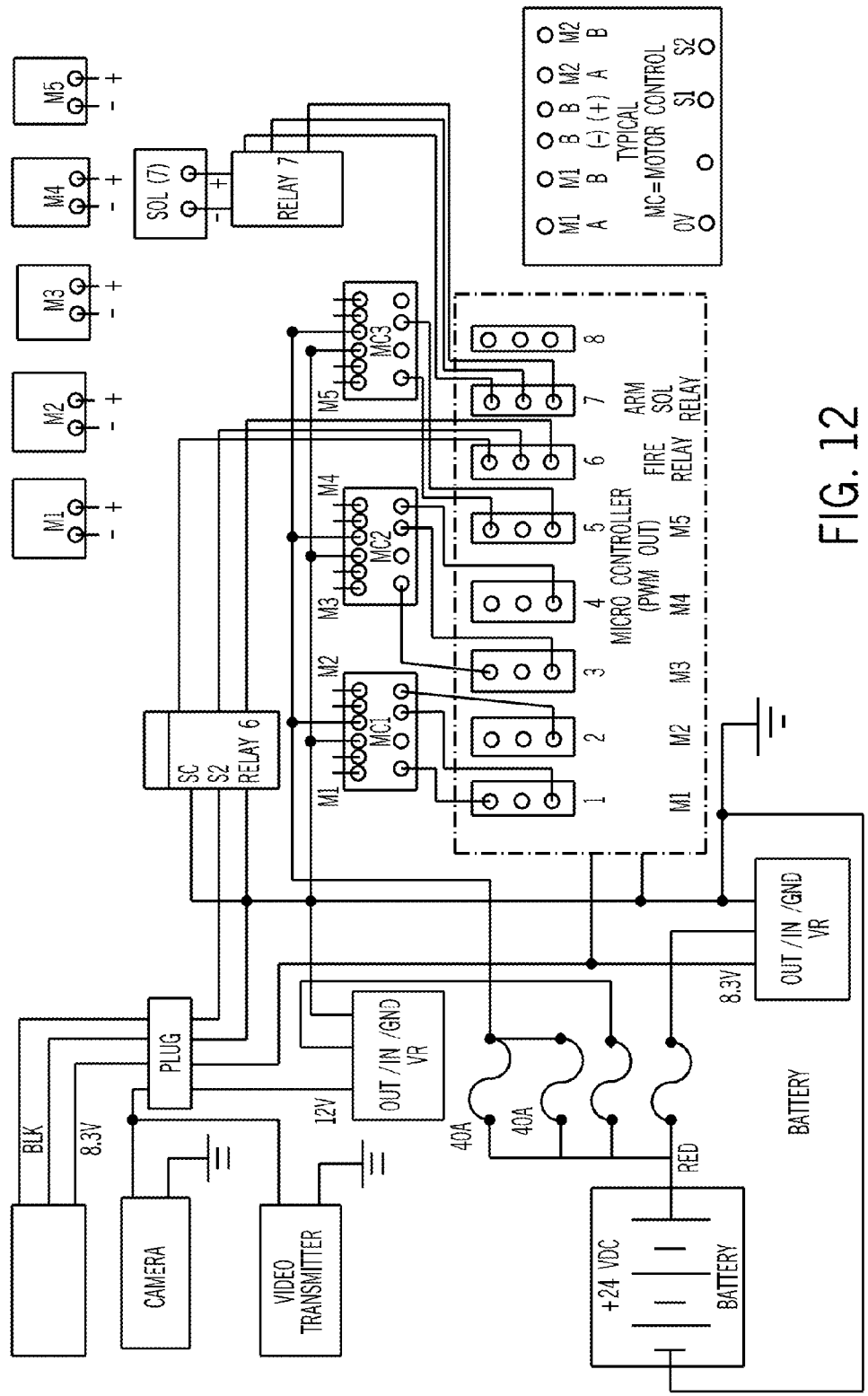
FIG. 12 illustrates an electrical schematic of the training device.
Figure 12A:
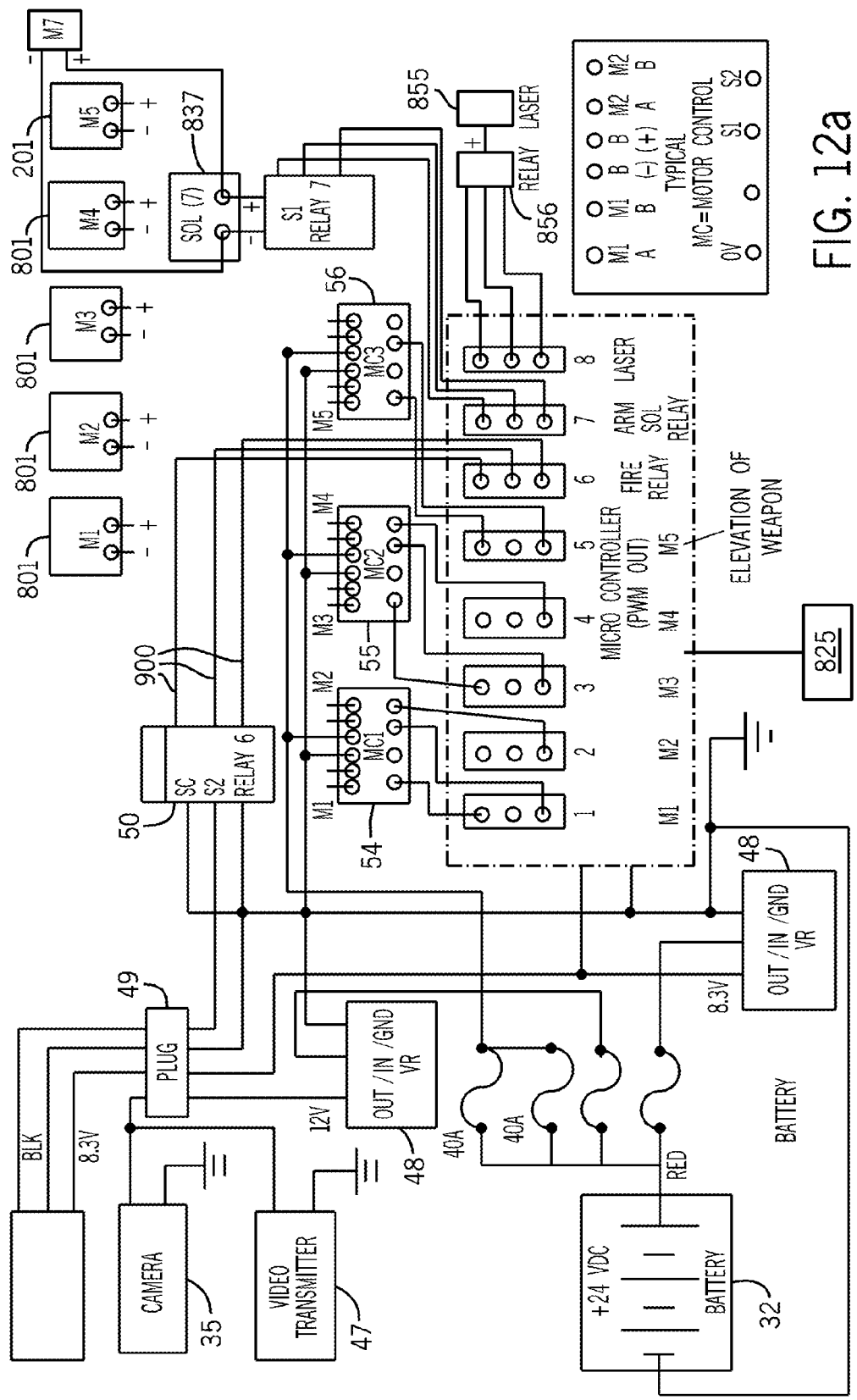
FIG. 12a illustrates an electrical schematic of the training device.

Referring now to FIGS. 10-11, an arm actuator air cylinder 80 may be located within the interior 17 of the base portion 10. The arm actuator air cylinder 80 may provide the pressure needed (via a compressed gas) to create movement of an arm portion 502 (as described below) of the target portion 500. The arm actuator air cylinder 80 may be mechanically connected to a cylinder mount pin 81. The cylinder mount pin 81 is affixed to the chassis plate 90.

Referring to FIG. 13, located within the base portion 10 may be a drive motor housing 99 having a shaft bearing 96. The shaft bearing 96 is friction fitted into a drive motor housing end 101 of a drive motor housing 99. The drive motor housing 99 affixes to the chassis plate 90 which provides a mounting surface for the drive motors 801 (FIG. 17) as well as a bearing mount 715 (FIG. 15), securing the shaft bearing 96 end opposite of the motor shaft end. This bearing and bearing mounting area of the drive motor housing 99 is directly adjacent to the wheel drive assembly 65. Further, a collar 97 may encircle the wheel drive assembly 65 having a set screw going through an opening in the wheel shaft 101. The wheel shaft 101 may connect to and may provide mechanical rotation initiated from the drive motor 801, continuing rotational energy motion to the wheels 65*a*-65*b*; then locking onto a motor shaft 155 (FIG. 8) located within the wheel shaft 101, fusing both shafts as one.

A main power switch 135 (FIG. 13) may be located on the bottom side 98 or top side 95 of the chassis plate 90. The main power switch 135 may allow the user to turn the device 1 on or off for use. In an embodiment, the device 1 may be powered by the battery pack 831 (FIG. 14).

Referring now to FIG. 14, located on the top side 95 of the chassis plate 90 may be camera 150. The camera 150 may be secured to the top side 95 of the chassis plate 90 by bolts or the like. The camera 150 may face outward from the base portion 10. An opening 151 in the base portion 10 may allow the camera 150 to record live video and photographic images of outside the base portion 10. The opening 151 may be covered by a transparent plate 333 which may be bullet resistant so as to protect the camera 150 and other components of the interior 17 of the base portion 10. The transparent plate 333 may mount directly to the base portion 10. A fastener or bracket 334 (FIG. 4) may be utilized for mounting the transparent plate 333 to the base portion 10.

A fan 153 (FIG. 14) may be located next to the camera 150 so as to cool the camera 150 and other electronics of the device 1 so as to ensure the device 1 does not overheat. A wireless video transmitter 247 may electronically send signals from the camera 150 to a video monitor 248 (FIG. 18) in a remote location wherein a user 600 may view and control the training exercise from the perspective of the device 1. A video cable 249 may electronically connect the camera 150 to the wireless video transmitter 247. A plurality of ventilation holes 605 may be present on the chassis plate 90 wherein the ventilation holes 605 bring in fresh air to circulate around the fan 153.

Secured to the top side 95 of the chassis plate 90 may be the training weapon 160. The training weapon 160 may face a corner of the base portion 10. More specifically, the training weapon 160 and the camera 150 may face in a substantially parallel position with respect to each other. The opening 517 in the base portion 10 may allow a barrel portion 165 of the training weapon 160 to extend from the interior 17 of the base portion 10 outward to the exterior of the base portion 10.

Figure 8:
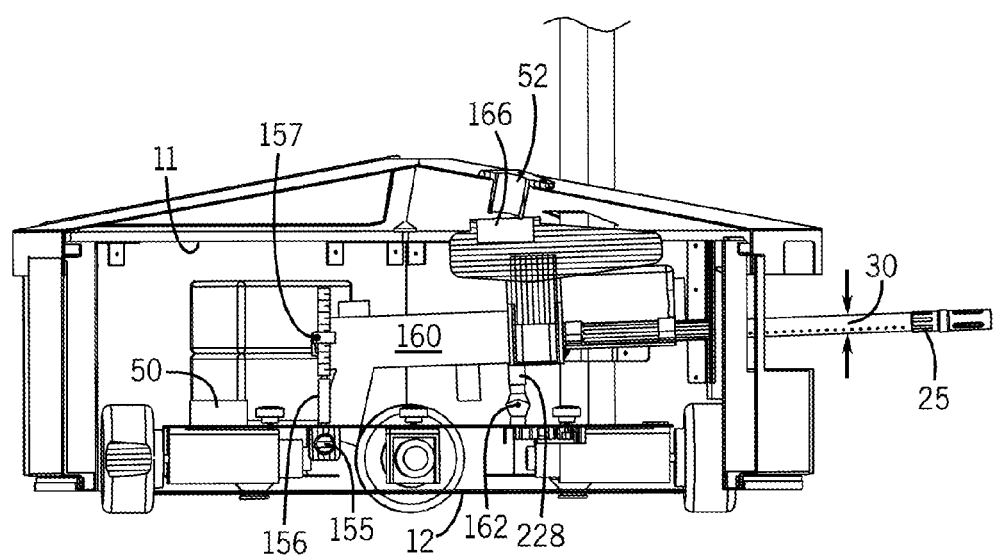
FIG. 8 illustrates a detailed interior view of the base portion of the training device.
Figure 9:
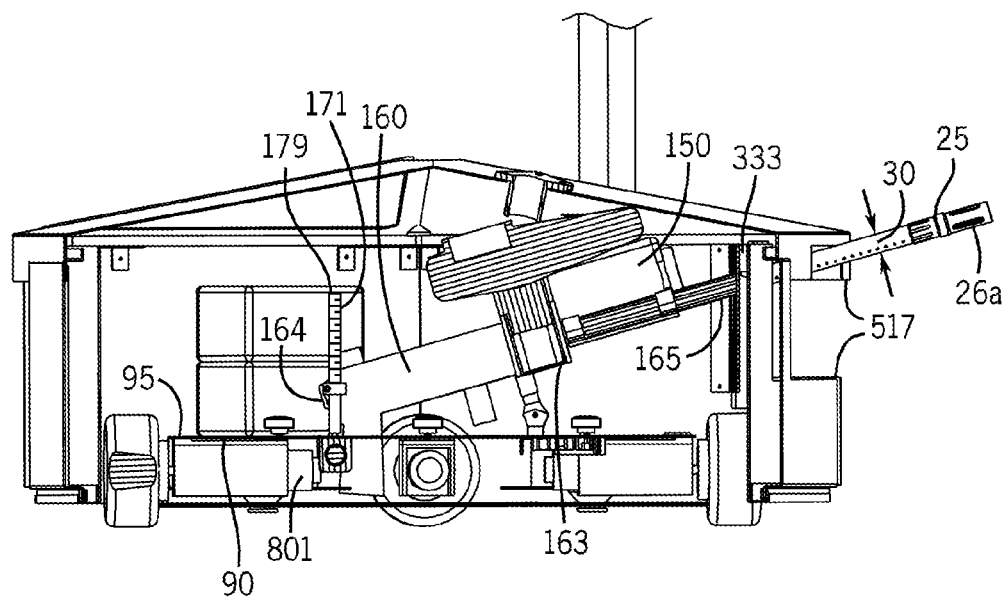
FIG. 9 illustrates a detailed interior view of the base portion of the training device.

Referring now to FIGS. 8 and 9, the training weapon 160 may have a front 163 and a back 164 (FIG. 9). The front 163 of the training weapon 160 may have the barrel portion 165 and may face outward whereas the back 164 of the training weapon 160 may remain within the interior 17 of the base portion 10. The back 164 of the training weapon 160 may be secured to a weapon shaft 171. The weapon shaft 171 may be a threaded shaft. The weapon shaft 171 may be a threaded shaft inserted into a female fastener consistent with a nut mounted to a cross shaft 90° or perpendicular to the weapon shaft 171. The rotation of the weapon shaft 171 may in turn move the training weapon 160 upward or downward to therein alter the barrel portion 165 of the training weapon 160. As a result, a user may move the barrel portion 165 upward from the first position 26a to the second position 26b to control where the training weapon 160 fires.

A hose propellant 176 (FIG. 14) may connect the training weapon 160 to a weapon propellant container 177. The weapon propellant container 177 may contain a pressurized gas such as, for example, pressurized air, CO2 or N2, which may provide the force to fire a training projectile 53 through the training weapon 160.

A target body motor pulley 200 (FIG. 14) may be secured to the rear of the interior 17 of base portion 10. The target body motor pulley 200 may be connected to the weapon elevation motor 201 which may provide power to rotate the target body motor pulley 200.

Figure 15:
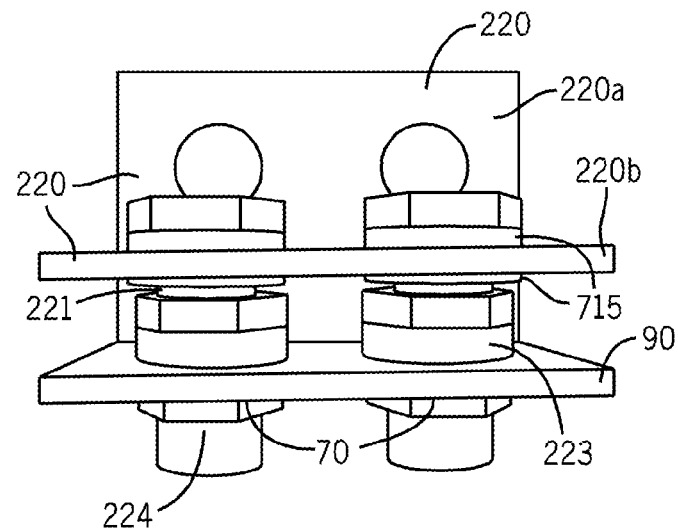
FIG. 15 illustrates the armor plate suspension system of the training device.

Referring now to FIG. 15, one of a plurality of base portion suspension brackets 220 is illustrated. More specifically, the base portion suspension brackets 220 may be located onto dampening bushings resting upon four of the eight opposing sides of the octagonal chassis plate 90. The base portion suspension brackets 220 may secure the chassis plate 90 to the base portion 10 on smooth fasteners 221 and locking fasteners 224. The smooth fastener 221 is free floating at the sleeve bearing mount 715 at the armor panel bracket 220 and is fixed on the opposing, locking fastener 224 location.

The interior 17 of the base portion 10 may have a rear shelf 202 (FIG. 14). The rear shelf 202 may attach to the base portion 10. In an embodiment, the rear shelf 202 may be used to mount the battery pack 831 (FIG. 6) and/or and the weapon elevation motor 201.

In an embodiment, a secondary battery pack mount 832 (FIG. 14) may be located at a rear corner of the base portion 10 containing the rear shelf 202 in which the battery pack 831 may be affixed to, with a reusable wire tie or other holding mechanism. The battery pack mount 832 may be attached to an interior wall 984 of the base portion 10 near the rear corner. In this embodiment, the rear shelf 202 and a strap may be used to secure a second battery pack to the battery pack mount 832.

A flexible shaft coupler 156 (FIG. 8) may couple a threaded shaft 171 to a motor shaft 155 therein allowing changes of the angle of the threaded shaft 171 resulting in a change in the direction of the barrel portion 165 of the training weapon 160. The threaded shaft 171 locks the flexible shaft coupler 156 to the elevation motor shaft 155 via a fastener which extends towards and into the motor shaft 155. Rotational energy exerted by the motor shaft 155 may cause the linear movement of an eyelet drive pin 157 to move towards or away from the motor shaft 155, resulting in training weapon muzzle 25 angle raising or lowering.

The barrel portion 165 of the training weapon 160 may be raised or lowered to accurately fire a training projectile 53 (FIG. 18) at the trainee 611. Accordingly, the elevation motor shaft 155 is provided. In an embodiment, the elevation motor shaft 155 may have a drive eyelet pin 157 (FIG. 8) which may mount through a cross-drilled, weapon foregrip 228 of the training weapon 160. The drive eyelet pin 157 may be free to rotate inside the base portion 10 to allow the free movement of the barrel portion 165 upward or downward. The drive eyelet pin 157 may have a female thread which correspondingly fits with a threaded shaft 171 (FIG. 9) therein allowing the female thread to rotate around the corresponding threaded shaft 171 therein raising or lowering the drive eyelet pin 157. The elevation motor shaft 155 may mount to the chassis plate 90 wherein the motor shaft 155 is directed toward the drive eyelet pin 157.

A weapon foregrip 228 may be used which may be laterally cross-drilled to accommodate the eyelet drive pin 157. A travel limiter 179 (FIG. 9) or (shaft collar in some embodiments) may be affixed to the threaded shaft 171 which may create a mechanical stop to prevent over travel of the eyelet drive pin 157 which as a result, prevents over movement of the barrel portion 165 of the device 1.

The location of the eyelet drive pin 157 and the pivot pin 162 (FIG. 8) on the chassis plate 90 may be reversed. The centrally located pivot pin 162 may allow a greater range of movement of the muzzle 25 elevation change. A rear located pivot pin 162 may result in a lessened range of muzzle elevation movement with greater accuracy over extended distances. As a result of the centrally located pivot pin 162, more adjustment control of the elevation of the muzzle 25 angle may be obtained and the device 1 may shoot longer distances.

Referring to FIGS. 14 and 15, as stated above, the chassis plate 90 may have a plurality of holes 70 on the eight opposing sides. A smooth fastener end (or shouldered end) 221 may be affixed to the chassis plate 90 via locking fasteners 224. The locking fastener 224 may be fitted with the sleeve bearings mount 715, in which a smooth end 221 of the locking fastener 224 may freely slide upward and downward in relation to upward and downward movement of the chassis plate 90, by way of the multi-directional wheels 65 which are attached to the chassis plate 90. The chassis plate 90 and attached components may raise and lower across unlevel ground, absorbing uneven ground imperfections as the bullet resistant plate 315 (FIG. 1) and mounted components remain stable and resistant to vibration and unwanted movement. The bullet resistant plate 315 may protect internal components of the base portion 10 from, for example, live gunfire 512 (FIG. 18) in which a trainee 611 may fire at the device 1. Further, the bullet resistant plate 315 may function as a mounting system for various components of the device 1 within the base portion 10.

Armor panel brackets 220 may secure the chassis plate 90 to the inner walls 18 (FIG. 4) of the base portion 10. The armor panel bracket 220 may have first a flat portion 220a and a second plate portion 220b. The first plate portion 220a may be substantially perpendicular with respect to the second plate portion 220b. The second plate portion 220b may be secured in a substantially perpendicular position with respect to the side walls 18 of the base portion 10 and secured directly to the chassis plate 90 and runs parallel with respect to the same.

A locking fastener 224 may be secured through an opening 70 in the first plate portion 220a (or second plate portion 220b) and an opening 70 in the chassis plate 90. The locking fastener 224 may secure the armor panel bracket 220 to the chassis plate 90. A compression damper 223 may be located between the chassis plate 90 and the second plate portion 220b. The compression damper 223 may act as a shock absorber and allow the device 1 to operate smoothly, including allowing the camera 150 to obtain a steady image.

Figure 17:
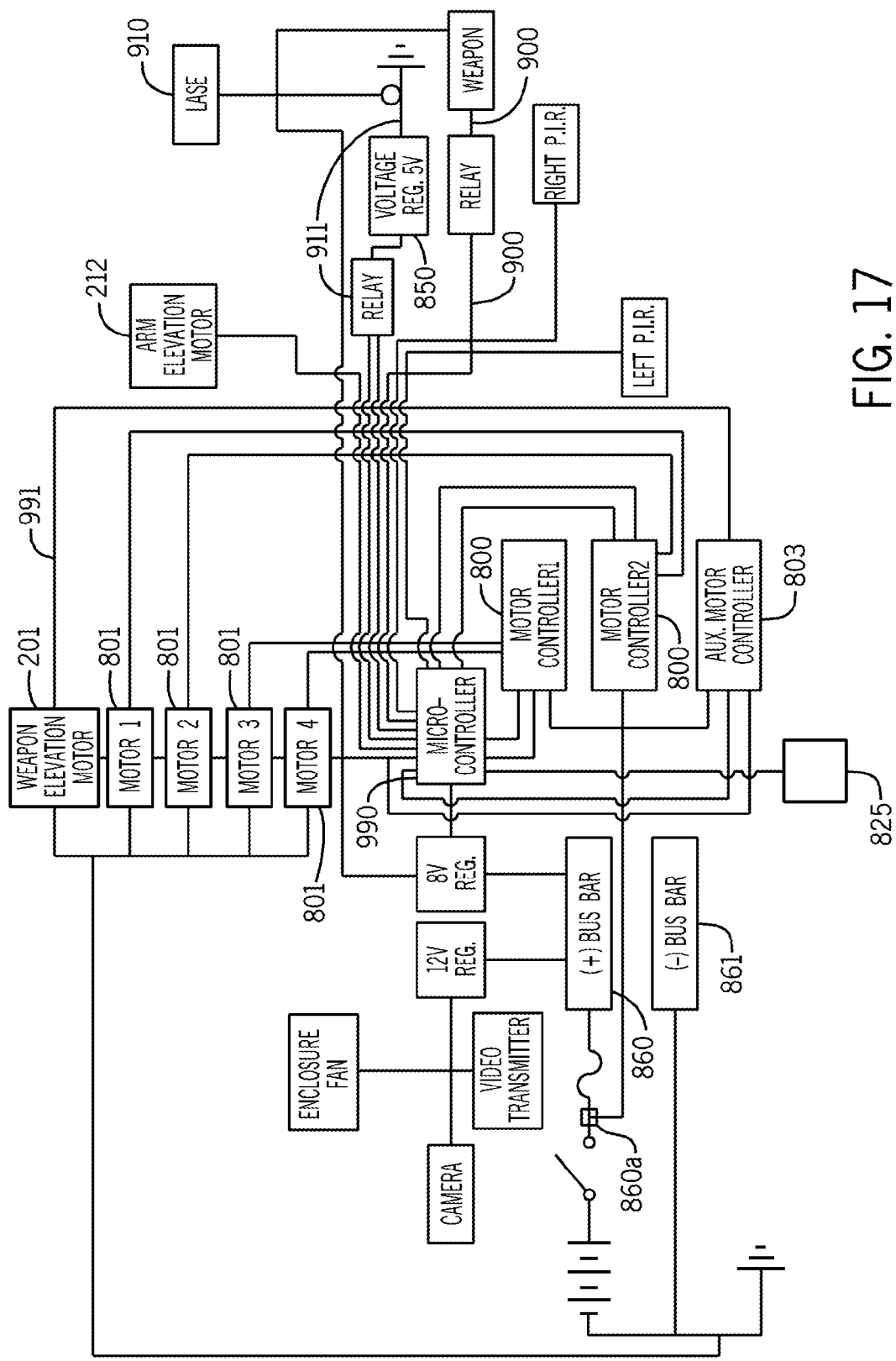
FIG. 17 illustrates an electrical schematic of the training device.
Figure 18:
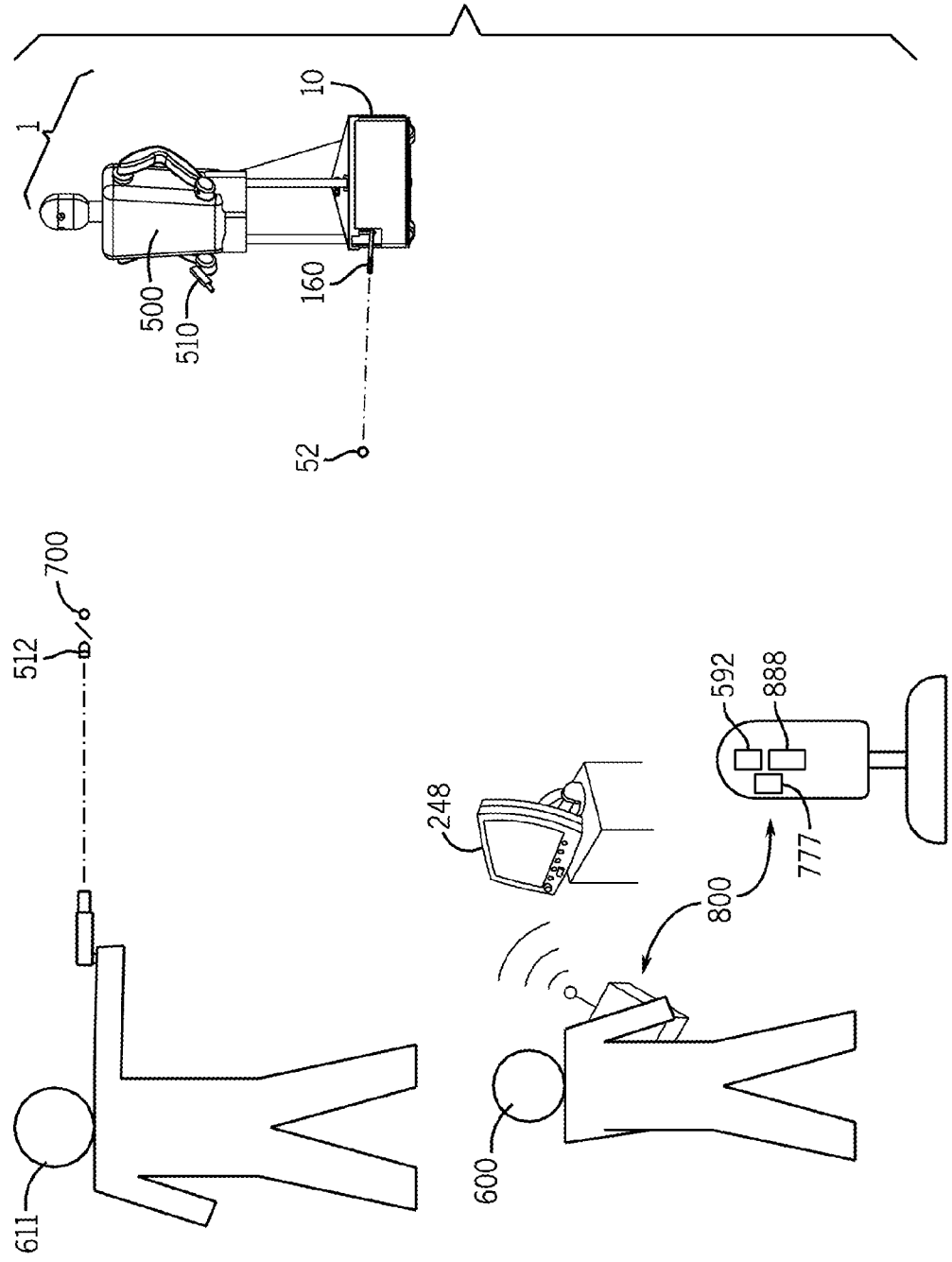
FIG. 18 illustrates the controller, the person being trained and the training device.

Referring now to FIGS. 17 and 18, a remote motor controller 800 is provided for controlling the device 1. The remote motor controller 800 may have the ability to control the movement of at least four independent drive motors 801 (FIGS. 9 and 17) located within the device 1. More specifically, the independent motors 801 control at least four independent inputs drive motors 801a and four independent outputs 802 to the independent motor drive motor 801. Auxiliary dual motor controllers 803 (FIG. 17) may control the weapon elevation motor 201 for all human, target body functions and may further control the optional elevation screw drive motor shaft 155.

A radio transmitter and slave processor 825 (FIG. 13) may be located within the interior 17 of the base portion 10 of the device 1. The radio transmitter and slave processor 825 may allow the user 600 to remotely move and operate the device 1 via the remote motor controller 800 which sends out a wireless signal radio frequency signal to the radio transmitter and slave processor 825. In turn, the radio transmitter and slave processor 825 within the base portion 10 may receive the radio signal and return a radio signal; therein allowing two way communication with the remote motor controller 800. As a result, a user 600 may operate the device 1 from a safe, secure and remote location from the device 1.

A voltage regulator 850 (FIG. 17) may be secured to the chassis plate 90. The voltage regulator 850 may prevent a high voltage charge from damaging the electrical components of the device 1. The voltage regulator 850 may be electrically connected to the battery pack 831. The voltage regulator 850 may further prevent damage to the electrical components caused by, for example, varying DC voltage requirements by different components.

A positive bus bar 860 (FIG. 13) and a negative bus bar 861 may be electrically connected to the electrical components of the device 1. The positive bus bar 860 and the negative bus bar 861 may allow the main power source to be outsourced from two main distribution points for positive and negative grounding DC power.

In an embodiment, the bullet resistant plate 315 is only located on two of the sides of the base portion 10. More specifically, the bullet resistant plate 315 is preferably located on the left side 15 and the front 13 of the base portion 10. Installing the bullet resistant plate 315 on only two sides (instead of four) of the base portion 10, greatly reduces the overall weight of the device 1. More specifically, if the bullet resistant plate 315 was located all the way around the base portion 10 the device 1 would weigh a good deal more and would be less efficient, slower and more expensive to manufacture. Further, because the device 1 generally faces forward so as to engage with the trainee 611, the device 1 remains substantially protected by having the bullet resistant plate 315 on only two sides of the base portion 10. Multiple armor panels (two or more) may be utilized as additional protection to the front armor plate.

A muzzle slot plate 922 (FIG. 16) may be secured to the barrel portion 165 of the training weapon 160. The muzzle slot plate 922 may be made of a bullet resistant material and may be largely rectangular in shape. The muzzle slot plate 922 may surround the barrel portion 165 of the training weapon 160. The muzzle slot plate 922 may act as a protective liner that consists of varying materials with non-frictional properties which may allow the barrel portion 165 of the training weapon 160 to pivot freely as the barrel portion 165 is raised or lowered and protects the interior 17 of the base portion 10 from damage obtained from a live projectile fired at the device 1 by a trainee 611.

The base portion 10 may have two target body leg receptacles 42 (on the cover plate 33) which may allow the support shafts 28 of the target portion 500 to pass through the cover plate 33 into the interior of base portion 10 and target mount points 505 (FIG. 14) therein holding the support shafts 28 firmly to the interior 17 of base portion 10. The target portion 500 may consist of, for example, two legs (also called the support shaft 28), a torso, two arms and two hands, with one or both hands holding a simulated weapon or other object for training or other purposes. Additionally, the hand and arm portions may move so as to simulate the raising and lowering of a hand holding any object, for example, a weapon or non-weapon for various purposes.

A top (or hopper deflector) 34 attaches onto or near the removable cover plate 33 and may mount to the top and/or front of the bullet resistant plate 315. The top 34 protects the weapon hopper 166 (FIG. 8) from projectile impacts and may deflect incoming rounds away from weapon hopper 166. In some embodiments, a projectile filler flange 52 is provided on the top 34.

Figure 16:
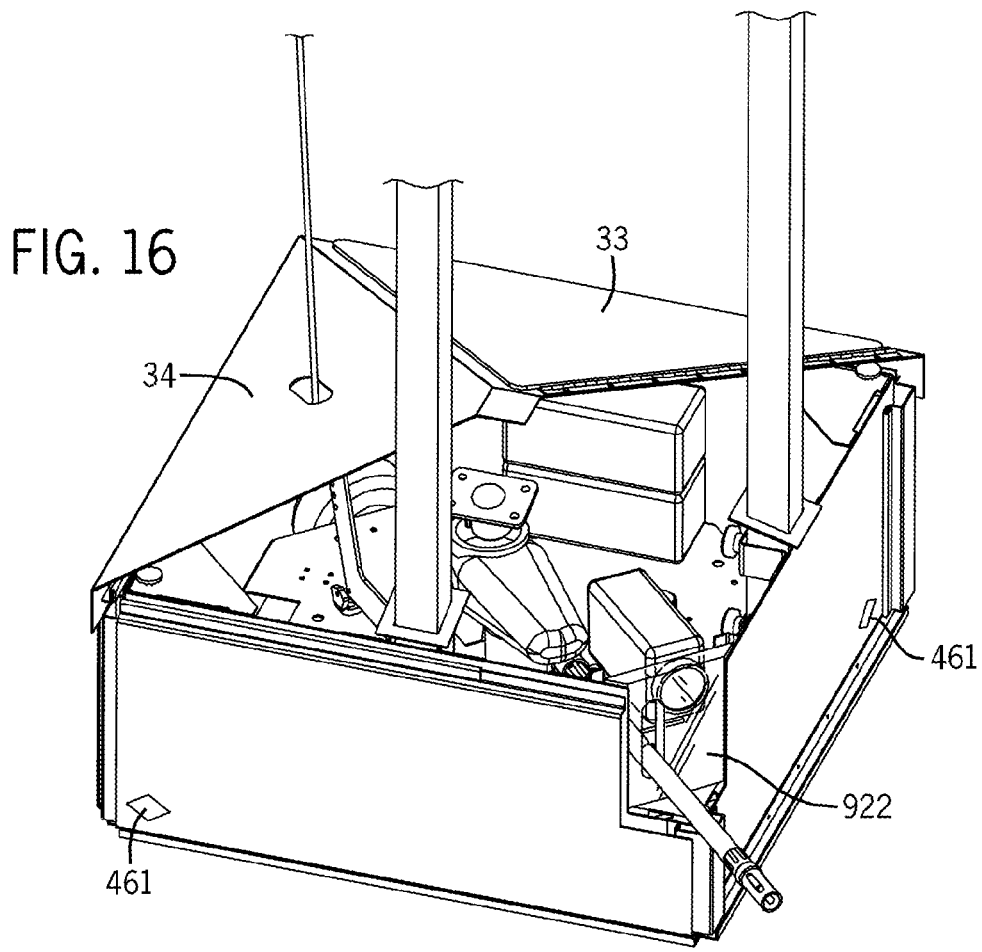
FIG. 16 illustrates a partial cut away view of the base portion of the training device.

Located within the interior 17 of the base portion 10 or on the base portion 10 surface may be at least one sensor 461 (FIG. 16). In an embodiment, the sensor 461 may be secured to the top side 95 of the chassis plate 90 of the device 1. The sensor 461 may be a passive infrared sensor which may be used to detect the movement of the trainee 611. In an embodiment, the sensor 461 may be mounted to the base portion 10 and the bullet resistant plate 315 in a friction fit manner. The sensor 461 may be mounted at varying angles of view for ideal sensing capabilities. More specifically, the sensors 461 may be mounted at varying angles to detect trainees 611 when the device 1 is used at various distances from the trainee 611.

The training weapon 160 may be secured to the chassis plate 90 of the base portion 10. A weapon mount pin 162 may be a dual shouldered pin which fits directly into the back 164 of the training weapon 160. In an embodiment, the training weapon 160 is a paintball gun.

Figure 19:
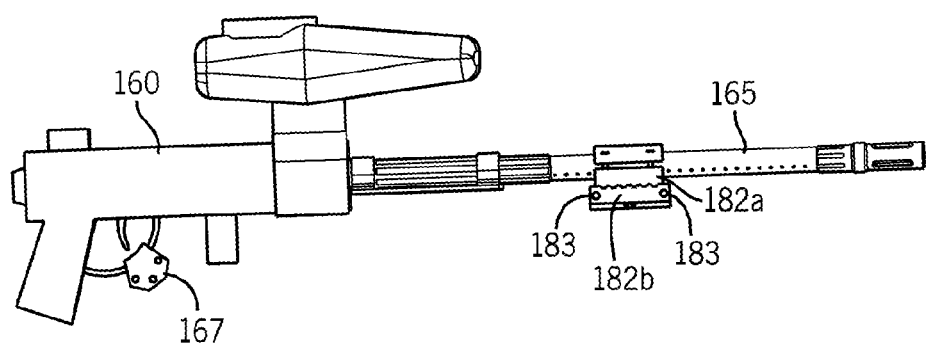
FIG. 19 illustrates the gun of the training device.
Figure 20:
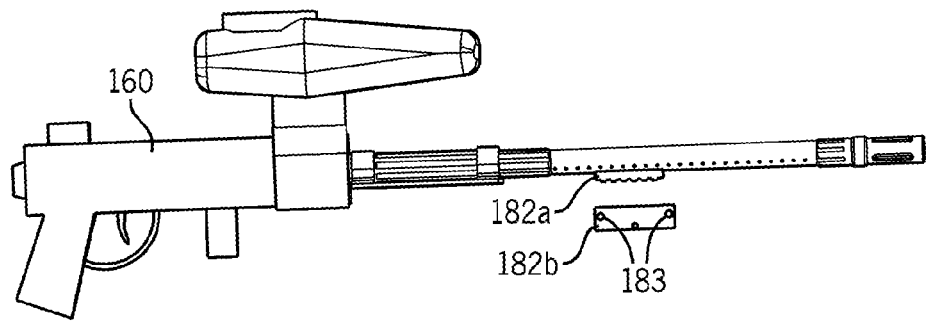
FIG. 20 illustrates the gun of the training device.
Figure 21:
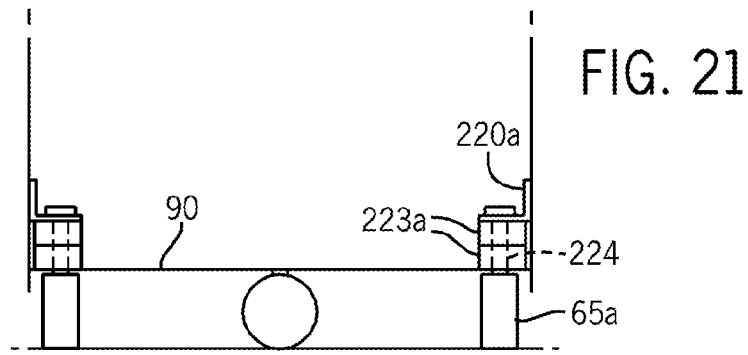
FIG. 21 illustrates a view of the chassis plate of the training device.
Figure 22:
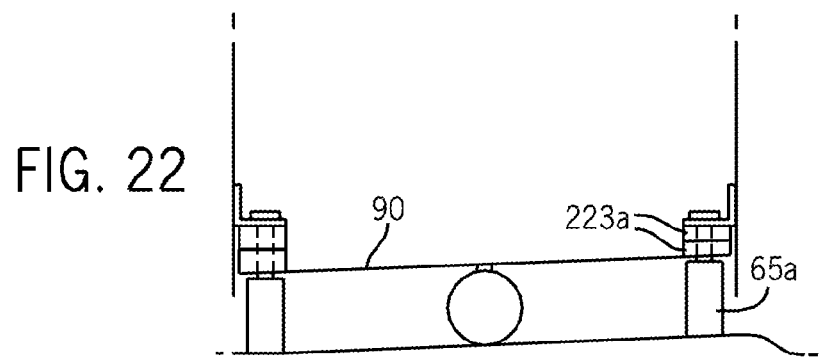
FIG. 22 illustrates another view of the chassis plate of the training device.
Figure 23:
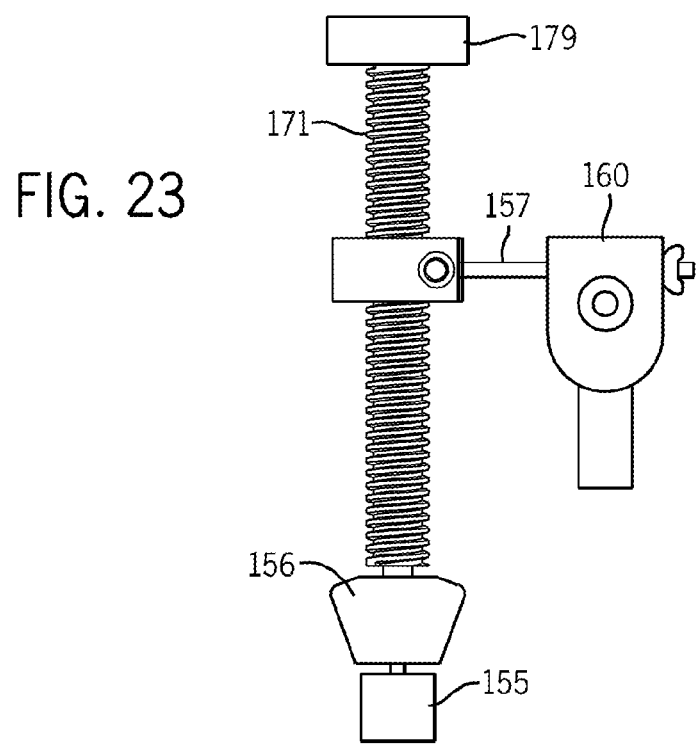
FIG. 23 illustrates the gun of the training device on the weapon shaft of the device.

In another embodiment, the training weapon 160 of the device 1 may have alternative mounting systems including but not limited to trigger guard mounts 167 (FIG. 19) and weaver rail mount 182*a*-182*b* affixed to the barrel portion 165 of the training weapon 160 with an attachment of the weapon mount pin 162 going into bearing block assembly 168 (FIG. 14) for elevation pivoting. The weaver rail mounts 182*a*-182*b* may be factory produced as a single unit with the training weapon 160 installed upon airsoft or less lethal projectile gun and may also host a weapon pin retainer 169 design affixed to a weapon mount pin 162.

Figure 14A:
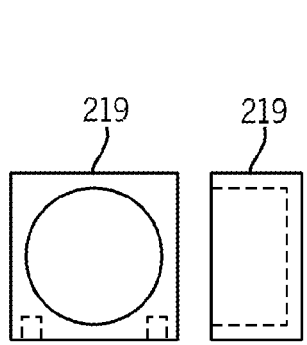
FIG. 14a illustrates the bearing block mount of the training device.

The weapon pin retainer 169 may connect to the weapon mount pin 162 therein suspending the training weapon 160 with each outer end fitting into a bearing block assembly 168. The bearing block assembly 168 may hold the bearing(s) 168 in place mounted to a bearing block mount 219 (FIG. 14*a*) which may be mounted into the base portion 10.

As stated above, the target portion 500 of the device 1 may be located above the top 11 of the base portion 10 of the device 1. The target portion 500 may be secured to the base portion 10 by a support shaft 28. In an embodiment, two support shafts 28 may be present and may resemble, for example, the legs of a person.

Referring now to FIGS. 10 and 11, in an embodiment, the target portion 500 of the device 1 may resemble a human being. More specifically, the target portion 500 may have a torso portion 501, at least one arm portion 502, and a head portion 503. The arm portion 502 of the device 1 may have a hand portion 505. The hand portion 505 of the device 1 may have a permanently attached or removable attached demo weapon 510. In an embodiment, the movable arm portion 502 may be controlled by the remote motor controller 800. In an embodiment, the demo weapon 510 may be a non-functional unit resembling a gun, weapon or other object. The target portion 500 may be intended to be impacted with all types of real live gunfire 512, less lethal projectiles 700, as well as energy weapons and impact weapons.

In an embodiment, the support shafts 28 of the device 1 may be commonly available 2"×2" square wood (or metal) with varying lengths, resulting in the target body portion 500 being similar with a person. The target portion 500 may be a full head-to-toe target or a partial target (torso only) portion 500 visibly appearing as a human person, capable of sustaining many live gunfire 512 (lethal projectiles) or non-lethal projectiles 700.

The arm 502 of the target portion 500 may have a bullet resistant metal material, having flexibility, typically with a length consistent with a human arm, pivoting upon a pivot shaft 506, mounting into the lateral side of either shoulder. On the opposing side of the pivot shaft 506 may be an arm activator lever 507, which may provide an attachment point for the cable (arm activator) 41.

The arm portion 502 of the target portion 500 may move. More specifically, the arm portion 502 may move from a first position A (FIG. 10) to a second position B (FIG. 11). In the first position A, the demo weapon 510 may be pointed in a downward non-threatening position. In the second position B (FIG. 11) the arm portion 502 may be electronically and/or mechanically raised so as the demo weapon 510 may be elevated to be pointed at the trainee 611 undergoing training. In this second position B, the demo weapon 510 may be largely in a parallel position with respect to the ground.

The cable 41 may be constructed of a strong, lightweight bullet resistant material which connects to a winch type motor assembly housed inside the base portion 10. In this embodiment, a metal cable may serve as cable 41 to execute the pulling motion from the first position A to the second position B. The arm portion 502 may return to the second position B due to gravity or as a result of an arm elevation motor reversing direction. Other embodiments may utilize a rod, gear, or other type of actuator, for varying pushing, pulling or twisting motions.

The weapon elevation motor 201 (FIG. 14) may be activated each time a weapon elevation button 592 (FIG. 18) is depressed on the remote motor controller 800. An arm button 777 may control the movement of the arm portion 502 of the target portion 500. In an embodiment, an arm solenoid 837 (FIG. 10) may actuate the arm actuator air cylinder 80 which causes movement of the arm portion 502.

Upon activation, the weapon elevation motor 201 may pull the rear end arm activator lever 507 of the weapon elevation motor 201, causing it to raise the arm portion 502 upwards, then releasing it a short time later. The result is a threatening visual effect of the target portion 500 simulating a person rising up various objects such as a handgun while simultaneously firing training projectiles 53 from the base unit 10 of the device 1.

The smooth movement of the device 1 on the ground is controlled by compression damper 223 which is inserted between the bullet resistant plate 315 and the chassis plate 90. The compression damper 223 may be made of, for example, rubber or a spring which suspends the weight of the bullet resistant plate 315 (and other mounted components) creating separation from the bullet resistant plate 315 and the chassis plate 90 so as to minimize the effect of imperfections in the ground's surface. Further, the compression dampener 223 may allow the multi-directional wheels 65a 65b to independently move upward or downward, acting in a suspension capacity allowing consistent traction and limiting unwanted rebounding or bouncing of the bullet resistant plate 315 and mounted components.

Referring now to FIG. 17, two Microchip PICT" processors 990 and slave processor 825 may be utilized to control a total of eight outputs: five weapon elevation motor 201 (four drive motors 801 and one weapon elevation motor 201 or one arm elevation motor 212, one fire control circuit 900, an arm elevation motor 212 and one laser circuit 910. The drive motor 801 may be connected to the wheels 65a, 65b which move the device 1 based on the users 600 command. The drive motors 801 may perform different motions (lateral, twisting, etc.) based on the inputs received from the remote motor controller 800. The arm elevation motor 212 may control the raising of the active arm 502 (FIG. 11) of the target portion 500 so as to emulate a human aiming a gun. The weapon elevation motor 201 may control the weapon elevation drive 155, 156, 157 by, for example, clockwise rotation of weapon elevation motor 201, causes eyelet drive nut to rise, lifting rear or training weapon 160 having causation of barrel 165 lowering in elevation angle; counter-clockwise rotation having opposite movement effect. The fire control, laser 855, active arm control, and weapon elevation drive systems are independent of the four other drive motors 801 that transport the device 1. These four outputs may have micro controller outputs with pulse with modulator (pwm) signals which may relate to all control systems and are actuated may be based on manual inputs, as opposed to the drive motors 801, which may be commanded manually or automatically, based on the origin of the inputs.

In an embodiment, the device 1 is setup utilizing two main processors 990 (FIG. 17) in conjunction with motor control circuitry 991 to enable the device 1 to perform a multitude of tasks. The master processor 990 may handle all of the background tasks, including the conversion of voltages between analog and digital domains, and also, the communications associated with the radio transmitter and slave processor 825. The slave processor 825 may handle all of the decision-making tasks, including the actions to be taken resulting from particular inputs, and also, the calculation of pulse width modulation (P.W.M.) values.

A typical operational cycle starts with the slave processor 825 receiving data from the radio transmitter and master processor 990 and the other system inputs. The master processor 990 then converts the analog voltages to the digital domain, latches the data, and sets a bit to indicate to the slave processor 825 that the data is ready to process. This happens roughly sixty times per second. The slave processor 825 calculates the PWM values necessary in order to achieve the commanded positions, or in the case of the elevation motor shaft 155 the commanded rate. In an embodiment, the master processor 990 may clear the data ready bit for the next cycle. Once the PWM values are calculated, the slave processor 825 may send the PWM values to the master processor 990 so that the master processor 990 may convert the PWM values into the analog voltages in order to physically run the motors. Finally, the master processor 990 outputs the translated PWM values to the drives and the desired motion takes place. This cycle repeats indefinitely.

A fire control circuit 900 may use a PWM (analog) output signal that will actuate on channel six (in an embodiment) based on an analog input (upper channel six, no relation to output's channel six) whose PWM value equals two hundred and twenty-five (100% of max) and whose duration is sixteen ms. Even though this particular setup may utilize these specific values, the values may be varied based on the particular configuration desired.

Achieving the same output, the system may be set up so that the fire button 888 (FIG. 18) has varying degrees of sensitivity and duration in order for the fire circuit to actuate. For example, applying pressure to the fire button 888, for example, for one second may also achieve this output exclusively by modifying the software to adjust sensitivity and duration. The channels utilized to achieve this may also change. The tolerance is that the fire control circuit 900 may be actuated using at least seventy-three percent pressure (−0%/+27%, or in case of reversed output, nominally 27%–27%+0%) and a duration between five ms and five hundreds. The PWM value may be strictly based on the system's maximum output value. The maximum PWM output value in this system is two hundred and twenty-five, because it utilizes an eight-bit unsigned system, so 2^8=255.

The laser control circuit 911 is a PWM (analog) output signal that may actuate for four seconds on channel seven (in an embodiment) based on an analog input (lower channel seven in this case) whose value equals zero (0% of max) and whose duration is sixteen milliseconds even though this particular setup utilizes these specific values, they can vary based on the particular configuration. Achieving the same output, the system can be set up so that the button has varying degrees of sensitivity and duration in order for the laser circuit to actuate. For example, applying seventy percent pressure to a button for one second can also achieve this output exclusively by modifying the software to adjust sensitivity and duration. The channels utilized to achieve this may also change. The tolerance is that the laser circuit will be actuated using at least seventy-three percent pressure (−0%/+27%, or in case of reversed output, nominally 27%–27%+0%) and a duration between five and five hundred milliseconds (ms). The laser can be set up to actuate for one to six seconds.

The weapon elevation control circuit is a PWM (analog) output signal (PWM channel eight in this case) that will command a servo motor to actuate the gun barrel when an analog input (channel three in this case) exceeds its threshold values, which are set up as one hundred and one hundred and fifth-four for this particular configuration. This particular system is set up as primarily a velocity controller, not a position controller. If channel three exceeds its threshold, the controller will command the barrel to move at a proportional rate to channel three's input until the barrel reaches its positional limits. If channel three is within its threshold, the controller will command zero velocity, thus regulating the barrel in its current position. The PWM values for the outputs can range from zero percent to one hundred percent of the PWM maximum value. The threshold values can be 100+−20 and 154+−20. The velocity can be any percentage of PWM max value/period. The period and channels may also vary.

The active arm control circuit is a PWM (analog) output signal that will actuate on channel five (in an embodiment) based on an analog input (lower channel six in this case) whose value initiates at one hundred and ninety (in this case). After approximately one second, the output will change to one hundred and fifty-five. This is so the motor is able to hold its current position holding the gun straight out while the laser is actuated. Once the laser times out (four seconds in this case), the gun arm motor will switch its output to eighty. This enables the tension to loosen and allow the arm to drop back down to the side of the robot in its resting position. Even though this particular setup utilizes these specific values, they can vary based on the particular configuration. Achieving the same output, the system can be set up so that the button has varying degrees of sensitivity and duration in order for the active arm circuit motor to actuate. For example, applying seventy percent pressure to a button for one second can also achieve this output exclusively by modifying the software to adjust sensitivity and duration. The channels utilized to achieve this may also change. The tolerance is that the active arm circuit will be actuated using at least seventy three percent pressure (−0%/+27%, or in case of reversed output, nominally 27%–27%+0%) and a duration between five ms and five hundred ms. The durations of all the individual stages of this circuit may vary based either on the duration of the laser or any alternative method.

The twisting control circuit consists of four PWM (analog) output signals (PWMs 1-4 in this case) that will actuate based on an analog input (PWM Channel four in this case) whose values are proportional to the input. The effect of all four motors actuating simultaneously is that the robot twists either clockwise or counter-clockwise, depending on the stick input. Even though this particular setup utilizes these specific values, they can vary based on the particular configuration. Achieving the same output, the system can be set up so that the robot twists at any speed proportional to the stick input.

The lateral control circuit consists of two PWM (analog) output signals (PWMs one and three in an embodiment) that will actuate based on an analog input (PWM Channel one in an embodiment) whose values are proportional to the input. The effect of these two motors actuating simultaneously is that the robot moves laterally, depending on the direction of the stick input. While the robot is moving laterally, it is also capable of twisting either clockwise or counter-clockwise using the remaining two DC motors (PWMs two and four in an embodiment). Even though this particular setup utilizes these specific values, they can vary based on the particular configuration. Any channel may be used to achieve this motion.

The Forward/Reverse control circuit consists of two PWM (analog) output signals (PWMs two and four in an embodiment) that will actuate based on an analog input (PWM Channel two in an embodiment) whose values are proportional to the input. The effect of these two motors actuating simultaneously is that the robot moves forward or backward, depending on the direction of the stick input. While the robot is moving forward or reverse, it is also capable of twisting either clockwise or counter-clockwise using the remaining two DC motors (PWMs one and three in an embodiment). Even though this particular setup utilizes these specific values, they can vary based on the particular configuration. Any channel may be used to achieve this motion.

Diagonal motion is achieved by actuating PWMs one and four simultaneously when both Channels one and two in an embodiment exceed their threshold values. PWM's one and three actuate to move the robot laterally while PWM's two and four actuate to move the robot forward and reverse simultaneously. This results in the robot moving diagonally. Even though this particular setup utilizes these specific values, they can vary based on the particular configuration. Any channel may be used to achieve this motion.

The robot utilizes two Passive Infrared Sensors (PIR) located on either side of the robot to sense human heat in order to form an auto-tracking system. If Channel one, two and four inputs are within their thresholds, the auto-tracking system gets activated. PWMs one through four are utilized to enable the robot to twist either clockwise or counter-clockwise in order to face the human target. If one sensor senses a human is present and the other sensor does not, the robot will twist in the appropriate direction to get the human target centered better with the gun barrel. The robot will twist at about thirty-three percent full speed for the duration that the PIR sensor exceeds its threshold values, which are set up as four hundred and sixty and six hundred in an embodiment. Even though this particular setup utilizes these specific values, they can vary based on the particular configuration.

Although embodiments of the training device 1 are shown and described therein, it should be understood that various changes and modifications to the presently preferred embodiments will be apparent to those skilled in the art. Such changes and modifications may be made without departing from the spirit and scope of the device for increasing tire friction and without diminishing its attendant advantages. It is, therefore, intended that such changes and modifications be covered by the appended claims.

I claim:

1. A moving target training system comprising:
    a mobile training device wherein the mobile training device receives lethal or non-lethal fire from a firearm or other weapon system and wherein the mobile training device has a target unit and a base unit and wherein the target unit is secured to the base unit;
    a plurality of wheels located within an interior of the base unit wherein the plurality of wheels allows the mobile training device to move;
    a radio receiver in communication with a central computer unit wherein both are located within the interior of the base unit wherein the radio receiver receives a radio signal from a control unit located remotely from the mobile training device;
    a training weapon located within the interior of the base unit wherein the training weapon is electrically connected to the central computer unit and wherein the training weapon fires a non-lethal physical projectile at a first person;
    wherein a second person through a remotely located control unit and an automated control system comprising active arm control and auto tracking system of the first person control the operation of the mobile training device; and
    a bullet-proof or bullet-resistant material shield located on and physically secured to at least two sides of the base unit wherein the bullet-proof or bullet-resistant material shield receives lethal gun fire from a firearm and protects components located within the interior of the base unit and wherein the bullet-proof or bullet-resistant material shield moves in unison with the base unit.

2. The moving target training system of claim 1 wherein the plurality of wheels of the base unit are located at four corners of the base unit and wherein a first wheel and a second wheel are on opposing corners of the base unit and are parallel to each other and wherein a third wheel and a fourth wheel are on opposing corners of the base unit and wherein the third wheel and the fourth wheel are parallel to each other and where the first wheel and the third wheel are perpendicular to each other.

3. The moving target training system of claim 2 wherein the mobile training device may rotate 360 degrees in approximately a zero radius manner 4. The moving target training system of claim 1 further comprising:
    a camera located within base unit of the mobile training device wherein the camera faces outward from the interior of the base unit and wherein a bullet-proof or bullet-resistant transparent layer is located on a side of the base unit and protects the camera and wherein the camera captures video and sends the video to a monitor at a remote location from the moving target training device.

5. The moving target training system of claim 4 wherein the video sent from the mobile training device to the control unit is LIVE video.

6. The moving target training system of claim 1 wherein the target unit resembles the form of a human and wherein a movable arm portion is secured to the torso portion and wherein the movable arm portion moves from a first position to a second position with respect to the torso portion which remains stationary and wherein the movement of the arm portion is controlled by the second person.

7. The moving target training system of claim 1 wherein the training weapon of the base unit moves from a first position to a second position and wherein the movement of the training weapon from the first position to the second position is controlled by the second person.

8. The moving target training system of claim 1 further comprising:
    a chassis plate having a top and a bottom wherein the chassis plate is located within the interior of the base portion wherein the chassis plate runs parallel with the top of the base unit and wherein the training weapon is secured to the top of the chassis plate.

9. The moving target training system of claim 8 further comprising:
    a pressurized container located on the top of the chassis plate wherein the pressurized container contains a pressurized gas wherein the pressurized container is connected to a hose and wherein the hose is connected to the training weapon and wherein the pressurized gas acts as the propellant for firing a physical projectile through the training weapon.

10. The moving target training system of claim 9 wherein the physical projectile is a paintball.

11. The moving target training system of claim 1 wherein the training system has further comprising a plurality of base units and a plurality of target units.

12. A moving target training system comprising:
    a mobile training device wherein the mobile training device receives lethal or non-lethal fire from a firearm or other weapon system and wherein the mobile training device has a target unit and a base unit and wherein the target unit is secured to the base unit;
    a plurality of tank tracks located within an interior of the base unit wherein the plurality of tank tracks allow the mobile training device to move;
    a radio receiver in communication with a central computer unit wherein both are located within the interior of the base unit wherein the radio receiver receives a radio signal from a control unit located remotely from the mobile training device; and
    a training weapon located within the interior of the base unit wherein the training weapon is electrically connected to the central computer unit and wherein the training weapon fires a non-lethal physical projectile at a first person; and
    wherein a second person through a remotely located control unit and an automated control system comprising active arm control and auto tracking system of the first person control the operation of the mobile training device.

* * * * *